United States Patent Office 3,819,629
Patented June 25, 1974

3,819,629
METHOD FOR PREPARING 2,4-DIAMINO-5-(3,4,5-TRIMETHOXYBENZYL)PYRIMIDINE
Barbara Roth, Scarsdale, and Justina Strelitz, Dobbs Ferry, N.Y., assignors to Burroughs Wellcome & Co. (U.S.A.) Inc., Tuckahoe, N.Y.
No Drawing. Continuation of application Ser. No. 9,121, Feb. 10, 1970, which is a continuation of application Ser. No. 613,450, Feb. 2, 1967, both now abandoned. This application Aug. 6, 1971, Ser. No. 169,828
Claims priority, application Great Britain, Feb. 19, 1966, 7,376/66
Int. Cl. C07d 51/42
U.S. Cl. 260—256.4 N                8 Claims

ABSTRACT OF THE DISCLOSURE

The method of preparing a compound I

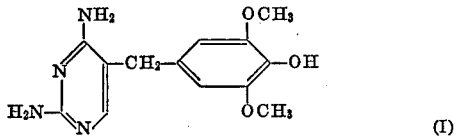

wherein R is an alkyl group, or an unsaturated alkyl group, and wherein the alkyl groups may also bear halogen substitution by reacting a compound (II)

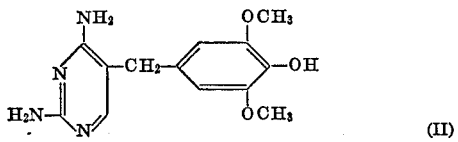

with an alkyl halide wherein R is defined as above. The invention also comprises compounds of formula (I) wherein R' is selected from the class consisting of an alkyl group having a halogen substitution and an unsaturated alkyl group.

Additionally, the term R in the formulas above may be an aralkyl group or an alkyl or alkoxy substituted aralkyl group.

---

This is a continuation of Ser. No. 9,121, filed Feb. 10, 1970, which itself was a continuation of Ser. No. 613,450, filed Feb. 2, 1967, both prior applications being now abandoned.

The present invention relates to novel benzyl pyrimidine compounds and to improved processes for the preparation thereof.

More particularly the present invention discloses a novel method of preparing 2,4-diamino-5-benzyl pyrimidines of formula I

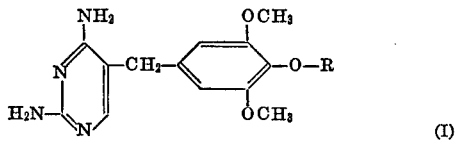

wherein R is an alkyl group which may also bear a halogen substitution. The known 2,4-diamino-5-[3',4',5'-trimethoxybenzyl]pyrimidine (Trimethoprim) (in formula I R=CH₃) is an antibacterial agent of proved value. (See U.S. Pat. 2,909,522, issued Oct. 20, 1959.) The variants wherein R is a higher alkyl group are also active and have certain advantages of distribution and penetration.

Additionally this invention provides novel compounds of formula I, wherein R is a halogenoalkyl group such as chloroalkyl, bromoalkyl and iodoalkyl groups or an unsaturated alkyl or aralkyl. It has been found that these compounds provide significant advantages in distribution and penetration with respect to treating selective bacterial infections in mammals. In particular these new and novel compounds are particularly effective against Staphylococcus aureus, Aerobacter aerogenes and Eschericia coli.

The new and novel compounds of formula I where R is a halogenoalkyl group or an unsaturated group such as an allyl group may preferably be given orally as tablets, capsules, etc., as bases or salts or may be injected in solution. The preferred dosages for these compounds are 5 to 10 mg./kg. of mammal body weight when given 2 to 3 times per day.

If a salt is used, the anion thereof must be devoid of inherent toxicity. Salts of the following acids are preferred: hydrochloric, phosphoric, succinic, lactic, acetic, pyruvic, oxaloacetic, fumaric, citric and isethionic.

In addition, the compounds of formula I are particularly useful as antibacterials in combination with sulfa compounds. For example, the combination of a sulfonamide and the compound of formula I may be given orally as tablets, capsules, etc. For oral administration, 400–600 mg. of sulfonamide may be combined with 100–200 mg. of the compounds of formula I and be given once to twice per day. These drugs act synergistically to provide an overall improved effect against the bacterial infections being treated.

In the method of the present invention the compounds of formula I are prepared by the reaction of the corresponding 4'-hydroxy compound of formula II with an alkyl halide in the presence of at least one equivalent of base such as a slight excess of alkali (base). The alkyl halides may be selected from the class comprising alkyl chlorides, alkyl bromides and alkyl iodides.

Although II has four nitrogen atoms that are capable of reacting with alkyl halides, it has been found that if the substance is kept in the anionic condition by employing a slight excess of alkali, the oxygen is alkylated preferentially and II is converted to I without serious loss.

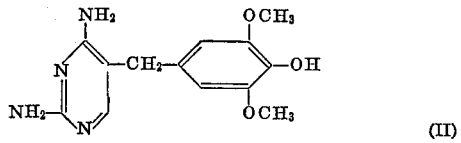

The above alkylation is accomplished conveniently in an alcoholic or aqueous alcoholic solution such as in a lower alcohol. The reaction can be run at room temperature or if warmed, can be completed more rapidly. The bases which may be used are alkali hydroxides and alkoxides such as potassium hydroxide, sodium hydroxide, sodium methoxide, potassium ethoxide and other equivalents thereof.

All temperatures in this application are in degrees centigrade.

EXAMPLE 1

2,6-dimethoxyphenol (92 g.) was slowly added to a mixture of 2N-hydrochloric acid (315 ml.), 25% aqueous dimethylamine (150 ml.) and 37% aqueous formaldehyde solution (81 g.). An exothermic reaction occurred and the mixture turned purple. Additional 25% aqueous dimethylamine (50 ml.) was added the solution was permitted to stand overnight. The product was isolated by evaporation of the solvent. The resultant tan solid was washed well with ether, followed by recrystallization from ethanol. This produced 2,6-dimethoxy-4 - (N,N - dimethylaminomethyl)phenol hydrochloride as white crystals melting at 224–224.2° (dec.).

A mixture of 2,4-diaminopyrimidine (3.3 g.), 2,6-dimethoxy-4 - (N,N-dimethylaminomethyl)phenol hydrochloride (7.43 g.), sodium methoxide (1.62 g.) and glycol (40 ml.) was heated under nitrogen in an oil bath at 150° for four hours, during which time dimethylamine was evolved. The solvent was removed and the residual material was then recrystallized twice from dimethylformamide, which yielded 2,4-diamino-5-(3',5'-dimethoxy-4'-hydroxybenzyl)pyrimidine as white crystals decomposing at 265-270° C.

Methyl iodide (1.42 g.) was added to a solution of 2,4 - diamino - 5 - (3',5'-dimethoxy-4'-hydroxybenzyl) pyrimidine (2.76 g.) in 40% aqueous methanol (35 ml.) plus a 3.2 N-methanolic solution of potassium hydroxide (4.5 ml.). The mixture was allowed to stand in a stoppered flask at room temperature for 72 hours, after which the solvent was removed and the residue extracted with water to remove impurities. Recrystallization from ethanol yielded crystals of 2,4-diamino-5-(3',4',5'-trimethoxybenzyl)pyrimidine, melting at 197-199° C. and identical in all respects with the product prepared by other synthetic routes (B. Roth, E. A. Falco, G. H. Hitchings and S. R. M. Bushby, *J. Med. Pharm. Chem.*, 5, 1103 (1962)).

EXAMPLE 2

A mixture of 2.76 grams (0.1 mole) of 2,4-diamino-5-[3',5' - dimethoxy - 4'-hydroxybenzyl]-pyrimidine, 1.21 grams (.01 mole) of allyl bromide and 0.6 grams (.0107 mole) of potassium hydroxide was dissolved in a mixture of 30 ml. of methanol and 10 ml. of water by heating on the steam bath for 30 minutes. The mixture was then allowed to stand in a stoppered flask at room temperature for three days. A white precipitate appeared, which was isolated and recrystallized from an ethonol-water mixture. There was thus obtained 2,4-diamino-5-[3',5'-dimethoxy-4'-allyloxybenzyl] pyrimidine, melting at 193-194° C.

EXAMPLE 3

2,4 - Diamino - 5-[3',5'-dimethoxy-4'-hydroxybenzyl] pyrimidine was treated with benzyl bromide in the manner described in Example 2, produce 2,4-diamino-5-[3',5'-dimethoxy-4'-benzyloxybenzyl] pyrimidine, which melted at 162-164° C. after recrystallization from dilute ethanol.

EXAMPLE 4

The reaction of 2,4-diamino-5-[3',5'-dimethoxy-4'-hydroxybenzyl] pyrimidine with 1-bromo-2-chloroethane was carried out in essentially the same manner as described in Example 3. There was thus produced 2,4-diamino - 5-[3',5'-dimethoxy-4'-(β-chloroethoxy) benzyl] pyrimidine. When recrystallized from dilute ethanol, this melted at 177-178° C.

EXAMPLE 5

By permitting hexyl bromide to stand with 2,4-diamino-5 - [3',5'-dimethoxy-4'-hydroxybenzyl] pyrimidine for 7 days in the manner described in Example 3, followed by warming on the steam bath for a short time, there was obtained 2,4 - diamino - 5-[3',5'-dimethoxy-4'-hexyloxybenzyl] pyrimidine. This melted at 158-159° C. after recrystallization from dilute ethanol.

EXAMPLE 6

In a reaction similar to that described in Example 2 octyl bromide was employed as the alkylating agent, and there was produced 2,4 - diamino-5-[3',5'-dimethoxy-4'-octyloxybenzyl] pyrimidine. This substance melted at 163° C. after recrystallization from ethanol.

EXAMPLE 7

A mixture of 2.76 grams of 2,4-diamino-5-[3',5'-dimethoxy-4'-hydroxybenzyl] pyrimidine, 1.73 grams of 1-bromo-3-chloropropane and 0.6 grams of potassium hydroxide was heated under reflux with 40 ml. of methanol and 10 ml. of water for a two hour period. The mixture was filtered from a trace of insoluble material, and the solvent removed. The residue was washed with cold water, and recrystallized from dilute ethanol, giving pure 2,4-diamino-5-[3',5'-dimethoxy - 4' - (γ - chloropropyloxy) benzyl] pyrimidine, melting at 179-180° C.

EXAMPLE 8

The alkylation of 2,4-diamino-5[3',5'-dimethoxy-4'-hydroxybenzyl] pyrimidine with 3,4,5-trimethoxybenzyl chloride was carried out in a manner similar to that described in Example 2, and there was thus produced 2,4-diamino - 5 - [3',5'-dimethoxy-4'-(3'',4'',5''-trimethoxybenzyloxy)benzyl] pyrimidine. This melted at 164-165° C. after recrystallization from ethanol.

What is claimed is:

1. The method of preparing a compound of the formula 1

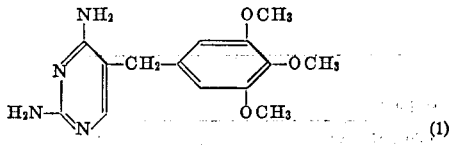

which comprises reacting in a solvent a methyl halide with 2,4 - diamino-5-(3',5'-dimethoxy-4'-hydroxybenzyl) pyrimidine in the presence of a slight excess of base selected from the class consisting of alkali hydroxide and alkoxide, and wherein the solvent is a lower alcohol or a lower alcohol mixed with water.

2. The method of claim 1 in which the reaction is carried on at a temperature of about 20° C. to about 100° C.

3. The method of claim 1 wherein the base is selected from the class consisting of potassium hydroxide, sodium hydroxide, sodium methoxide and potassium ethoxide.

4. The method of claim 1 in which the methyl halide is methyl iodide.

5. The method of claim 1 in which the lower alcohol is methanol.

6. The method of claim 4 in which the base is selected from the class consisting of potassium hydroxide, sodium hydroxide, sodium methoxide and potassium ethoxide.

7. The method of claim 6 in which the reaction is carried on at a temperature of about 20° C. to about 100° C.

8. The method of claim 7 in which the lower alcohol is methanol.

References Cited

UNITED STATES PATENTS

| | | | |
|---|---|---|---|
| 3,692,787 | 9/1972 | Roth et al. | 260—256.4 N |
| 1,784,408 | 12/1930 | Zitscher | 260—575 |
| 3,419,573 | 12/1968 | Weinstock | 260—306.7 |

OTHER REFERENCES

Hunig, Berichte; 85, 1056-60 (1952).

Wagner, et. al.; *Synthetic Organic Chemistry*, Wiley, N.Y., 1953, pp. 226-8.

RICHARD J. GALLAGHER, Primary Examiner